(12) United States Patent
Joos et al.

(10) Patent No.: US 10,214,821 B2
(45) Date of Patent: *Feb. 26, 2019

(54) ELECTROLYSER AND ENERGY SYSTEM

(71) Applicant: HYDROGENICS CORPORATION, Mississauga (CA)

(72) Inventors: Nathaniel Ian Joos, Toronto (CA); Joseph Cargnelli, Toronto (CA)

(73) Assignee: HYDROGENICS CORPORATION, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,309

(22) PCT Filed: May 27, 2013

(86) PCT No.: PCT/CA2013/050404
§ 371 (c)(1),
(2) Date: Nov. 26, 2014

(87) PCT Pub. No.: WO2013/177700
PCT Pub. Date: Dec. 5, 2013

(65) Prior Publication Data
US 2015/0167182 A1    Jun. 18, 2015

Related U.S. Application Data

(60) Provisional application No. 61/652,263, filed on May 28, 2012.

(51) Int. Cl.
*C02F 1/46* (2006.01)
*H01M 8/06* (2016.01)
(Continued)

(52) U.S. Cl.
CPC ................ *C25B 9/06* (2013.01); *C25B 1/04* (2013.01); *C25B 9/18* (2013.01); *C25B 15/02* (2013.01);
(Continued)

(58) Field of Classification Search
CPC .......................... H01M 8/04089; H01M 8/22
See application file for complete search history.

(56) References Cited

U.S. PATENT DOCUMENTS 3,608,529 A    9/1971    Smith et al.
3,608,660 A    9/1971    Smith et al.
(Continued)

FOREIGN PATENT DOCUMENTS

CA    2093193 A1    10/1993
CA    2209237        12/1998
(Continued)

OTHER PUBLICATIONS

Hydrogenics Corporation, PCT/CA2013/050404, International Search Report, dated Aug. 21, 2013.
(Continued)

*Primary Examiner* — Talia F Crawley

(57) ABSTRACT

An electrolyzer operates within an energy system, for example to provide grid services, energy storage or fuel, or to produce hydrogen from electricity produced from renewable resources. The electrolyzer may be configured to operate at frequently or quickly varying rates of electricity consumption or to operate at a specified power consumption. In one process of operating an electrolyzer, a series of dispatches is received indicating a specified power consumption for a period of time. The dispatches may occur at least once every 30 minutes. The electrolyzer is operated according to the dispatches. Hydrogen produced by the electrolyzer is discharged to a natural gas system.

15 Claims, 5 Drawing Sheets

(51) Int. Cl.

| | | |
|---|---|---|
| *F02B 43/10* | (2006.01) | |
| *C25B 9/06* | (2006.01) | |
| *C25B 15/02* | (2006.01) | |
| *C25B 1/04* | (2006.01) | |
| *G06Q 30/04* | (2012.01) | |
| *C25B 9/18* | (2006.01) | |
| *G06Q 50/06* | (2012.01) | |

(52) U.S. Cl.
CPC ............ *G06Q 30/04* (2013.01); *G06Q 50/06* (2013.01); *Y02E 60/366* (2013.01); *Y02E 70/10* (2013.01); *Y02P 20/133* (2015.11)

(56) References Cited

U.S. PATENT DOCUMENTS

| | | |
|---|---|---|
| 3,635,812 A | 1/1972 | Spacil |
| 3,648,668 A | 3/1972 | Pacheco |
| 3,755,128 A | 8/1973 | Herwig |
| 3,917,520 A | 11/1975 | Katz et al. |
| 3,932,735 A * | 1/1976 | Giras ............... H02J 3/00 700/287 |
| 4,002,553 A | 1/1977 | Amtz |
| 4,084,038 A | 4/1978 | Scragg et al. |
| 4,085,709 A | 4/1978 | Tangri |
| 4,095,118 A | 6/1978 | Rathbun |
| 4,084,032 A | 11/1978 | Pasersky |
| 4,146,800 A | 3/1979 | Gregory et al. |
| 4,161,657 A | 7/1979 | Shaffer, Jr. |
| 4,176,023 A | 11/1979 | Childress |
| 4,184,084 A | 1/1980 | Crehore |
| 4,211,537 A | 7/1980 | Teitel |
| 4,233,132 A | 11/1980 | Carr et al. |
| 4,276,145 A | 6/1981 | Skala |
| 4,294,274 A * | 10/1981 | Leroy ............... B01J 3/02 137/154 |
| 4,344,831 A | 8/1982 | Weber |
| 4,353,214 A | 10/1982 | Gardner |
| 4,436,793 A | 3/1984 | Adlhart |
| 4,689,133 A | 8/1987 | McIlhenny |
| 4,776,171 A | 10/1988 | Perry, Jr. et al. |
| 4,781,029 A | 11/1988 | SerVaas |
| 4,910,963 A | 3/1990 | Vanzo |
| 4,988,580 A | 1/1991 | Ohsaki et al. |
| 5,037,518 A | 8/1991 | Young et al. |
| 5,082,544 A | 1/1992 | Willey et al. |
| 5,192,627 A | 3/1993 | Perry et al. |
| 5,219,671 A | 6/1993 | Parker et al. |
| 5,312,699 A | 5/1994 | Yanagi et al. |
| 5,346,778 A | 9/1994 | Ewan et al. |
| 5,372,617 A | 12/1994 | Kerrebrock et al. |
| 5,374,341 A | 12/1994 | Aoki et al. |
| 5,432,710 A | 7/1995 | Ishimaru et al. |
| 5,512,145 A | 4/1996 | Hollenberg |
| 5,512,787 A | 4/1996 | Dederick |
| 5,527,632 A | 6/1996 | Gardner |
| 5,592,028 A | 1/1997 | Pritchard |
| 5,621,654 A * | 4/1997 | Cohen ............... F01K 13/02 700/287 |
| 5,625,267 A | 4/1997 | Gregory |
| 5,658,448 A | 8/1997 | Lasich |
| 5,686,766 A | 11/1997 | Tamechika |
| 5,690,797 A | 11/1997 | Harada et al. |
| 5,702,491 A | 12/1997 | Long et al. |
| 5,708,424 A | 1/1998 | Orlando et al. |
| 5,711,865 A | 1/1998 | Caesar |
| 5,767,584 A | 6/1998 | Gore et al. |
| 5,779,866 A | 7/1998 | Tarancon |
| 5,795,666 A | 8/1998 | Johnssen |
| 5,799,624 A | 9/1998 | Hsieh |
| 5,817,157 A | 10/1998 | Checketts |
| 5,818,725 A | 10/1998 | McNamara et al. |
| 5,840,172 A | 11/1998 | Zugravu |
| 5,858,568 A | 1/1999 | Hsu et al. |
| 5,899,072 A | 5/1999 | Gode |
| 5,900,330 A | 5/1999 | Kagatani |
| 5,955,039 A | 9/1999 | Dowdy |
| 5,964,089 A | 10/1999 | Murphy et al. |
| 5,980,726 A | 11/1999 | Moulthrop, Jr. et al. |
| 5,999,888 A | 12/1999 | Aubee |
| 6,011,324 A | 1/2000 | Kohlstruck et al. |
| 6,021,402 A | 2/2000 | Takriti |
| 6,026,349 A | 2/2000 | Heneman |
| 6,057,051 A | 5/2000 | Uchida et al. |
| 6,064,311 A | 5/2000 | Ferenczi et al. |
| 6,083,637 A | 7/2000 | Walz et al. |
| 6,102,958 A | 8/2000 | Meystel et al. |
| 6,107,691 A | 8/2000 | Gore et al. |
| 6,146,518 A * | 11/2000 | Fairlie ............... C25B 15/02 204/228.2 |
| 6,153,058 A | 11/2000 | Richardson, Jr. |
| 6,153,943 A | 11/2000 | Mist, Jr. |
| 6,187,155 B1 * | 2/2001 | Stuart ............... H01M 8/246 204/254 |
| 6,254,741 B1 * | 7/2001 | Stuart ............... C25B 9/20 204/254 |
| 6,285,178 B1 | 9/2001 | Ball et al. |
| 6,285,964 B1 | 9/2001 | Babel et al. |
| 6,294,276 B1 | 9/2001 | Ogino |
| 6,311,105 B1 | 10/2001 | Budike, Jr. |
| 6,338,786 B1 * | 1/2002 | Thorpe ............... C25B 9/18 204/267 |
| 6,366,889 B1 | 4/2002 | Zaloom |
| 6,375,812 B1 * | 4/2002 | Leonida ............... C25B 1/04 204/269 |
| 6,395,154 B1 * | 5/2002 | Stuart ............... C25B 9/20 204/253 |
| 6,432,283 B1 | 8/2002 | Fairlie et al. |
| 6,495,277 B1 | 12/2002 | Edlund et al. |
| 6,512,966 B2 | 1/2003 | Lof et al. |
| 6,531,516 B2 | 3/2003 | Davis et al. |
| 6,670,721 B2 | 12/2003 | Lof et al. |
| 6,673,479 B2 | 1/2004 | McArthur et al. |
| 6,745,105 B1 | 6/2004 | Fairlie et al. |
| 6,774,506 B2 | 8/2004 | Hashimoto et al. |
| 6,787,258 B2 | 9/2004 | Prerad |
| 7,181,316 B2 | 2/2007 | Fairle et al. |
| 7,329,343 B1 | 2/2008 | Barnes |
| 7,381,313 B2 * | 6/2008 | Libby ............... C25B 1/04 204/228.1 |
| 7,794,887 B2 | 3/2010 | Hirata |
| 8,057,646 B2 * | 11/2011 | Hinatsu ............... C25B 9/18 204/256 |
| 8,288,888 B2 | 10/2012 | Hinatsu et al. |
| 8,734,622 B2 * | 5/2014 | Karabin ............... C25B 9/18 204/237 |
| 2002/0017463 A1 * | 2/2002 | Merida-Donis ......... C25B 1/04 204/551 |
| 2002/0025457 A1 | 2/2002 | Dodd |
| 2002/0093201 A1 | 7/2002 | Soucy |
| 2002/0100681 A1 * | 8/2002 | Kirk ............... C25B 9/20 204/263 |
| 2002/0103745 A1 | 8/2002 | Lof et al. |
| 2002/0111905 A1 | 8/2002 | Nagafuchi et al. |
| 2003/0009265 A1 | 1/2003 | Edwin |
| 2003/0074244 A1 | 4/2003 | Braxton |
| 2003/0196893 A1 * | 10/2003 | McElroy ............... C25B 1/02 204/266 |
| 2004/0013923 A1 | 1/2004 | Molter et al. |
| 2004/0040304 A1 | 3/2004 | Wolff |
| 2004/0131508 A1 | 7/2004 | Fairlie et al. |
| 2004/0205032 A1 | 10/2004 | Routtenberg et al. |
| 2005/0000798 A1 | 1/2005 | Faita et al. |
| 2005/0034998 A1 | 2/2005 | Prerad |
| 2005/0109394 A1 * | 5/2005 | Anderson ............... C25B 1/04 136/244 |
| 2006/0028178 A1 | 2/2006 | Hobbs |
| 2007/0042233 A1 * | 2/2007 | Lyman ............... H01M 8/04567 429/9 |
| 2007/0080071 A1 * | 4/2007 | Perry, Jr. ............... C25B 1/02 205/638 |
| 2007/0116996 A1 * | 5/2007 | Pavlik ............... H01M 8/0258 429/422 |

(56) References Cited

U.S. PATENT DOCUMENTS

| | | | |
|---|---|---|---|
| 2007/0119718 | A1 | 5/2007 | Gibson et al. |
| 2007/0282495 | A1 | 12/2007 | Kempton et al. |
| 2008/0047502 | A1* | 2/2008 | Morse .................. C25B 1/12 123/3 |
| 2008/0154801 | A1 | 6/2008 | Fein et al. |
| 2010/0114395 | A1* | 5/2010 | Hinatsu .................. C25B 15/02 700/295 |
| 2010/0259102 | A1 | 10/2010 | Guelbenzu et al. |
| 2011/0086280 | A1 | 4/2011 | Roustaei |
| 2011/0276194 | A1 | 11/2011 | Emalfarb et al. |
| 2012/0067079 | A1 | 3/2012 | Sethna et al. |
| 2013/0317959 | A1* | 11/2013 | Joos .................. C25B 15/02 705/34 |

FOREIGN PATENT DOCUMENTS

| | | |
|---|---|---|
| CA | 2241846 A1 | 12/1998 |
| CA | 2387634 A1 | 4/2001 |
| CA | 2455689 A1 | 7/2005 |
| CA | 2511632 A1 | 8/2005 |
| DE | 3804659 | 8/1989 |
| DE | 4020721 | 1/1992 |
| DE | 19612776 | 10/1997 |
| DE | 102004030717 | 1/2006 |
| DE | 102010020762 | 11/2011 |
| EP | 0755088 | 1/1997 |
| EP | 0862234 A1 | 9/1998 |
| EP | 0905498 | 3/1999 |
| EP | 0862234 B1 | 11/1999 |
| EP | 1270765 A1 | 2/2003 |
| EP | 0755088 B1 | 6/2004 |
| EP | 1177154 B1 | 7/2006 |
| GB | 2143848 | 2/1985 |
| JP | 51-48818 | 4/1976 |
| JP | 57-42501 | 3/1982 |
| JP | 01200052 | 8/1989 |
| JP | 02-117072 | 5/1990 |
| JP | H0491638 A | 3/1992 |
| JP | 07-99707 | 4/1995 |
| JP | 07-101316 | 4/1995 |
| JP | 08-260176 | 10/1996 |
| JP | 09-306531 | 11/1997 |
| JP | H10147871 A | 6/1998 |
| JP | 10-299576 | 11/1998 |
| JP | 2002527539 A | 8/2002 |
| JP | 2005126792 A | 5/2005 |
| JP | 2007031813 | 2/2007 |
| JP | 2007523580 A | 8/2007 |
| JP | 2009077457 A | 4/2009 |
| JP | 2010500272 A | 1/2010 |
| JP | 2011050138 A | 3/2011 |
| JP | 2011182516 A | 9/2011 |
| WO | 9612871 A1 | 5/1996 |
| WO | 0069773 | 11/2000 |
| WO | 0128017 | 4/2001 |
| WO | 02103879 A1 | 12/2002 |
| WO | 03107508 | 12/2003 |
| WO | 2004027563 A2 | 4/2004 |
| WO | 2005071815 A1 | 8/2005 |
| WO | 2011060953 | 5/2011 |
| WO | 2011131868 A1 | 10/2011 |
| WO | 2011144198 | 11/2011 |

OTHER PUBLICATIONS

Senjyu T et al., "A hybrid power system with using alternative energy facilities in isolated island", IEEE/PES Transmission and Distribution Conference and Exhibition 2002 : Asia Pacific. Yokohama, Japan, Oct. 6-10, 2002.

Oney, F. et al., "Evaluation of pipeline transportation of hydrogen and natural gas mixtures", International Journal of Hydrogen Energy 19(10):813-822 • Sep. 1994.

Padro Ceg and Putsche V., Survey of the economics of hydrogen technologies. Report No. NREL/TP-570-27079, National Renewable Energy Laboratory, US Department of Energy; 1999.

Lundberg, Robert M., et al. "Hydrogen Potential Key to Tomorrow's Energy Utility", Hydrogen for energy distribution: symposium papers, presented Jul. 24-28, 1978, Chicago, Illinois, pp. 583-587.

Mehta, B.R., "Status of EPRI's hydrogen program", International Journal of Hydrogen Energy 6(6), pp. 625-629, 1981.

European Search Report dated Jan. 5, 2016, issued in related European Application No. 13797963.9.

International Preliminary Report on Patentability for Application No. PCT/CA2013/050404, dated Dec. 11, 2014, 8 pages.

Office Action dated Jul. 18, 2016 issued on the Corresponding Chinese Application No. CN2013839099. 4 pages.

Supplementary European Search Report for Application No. EP04789715, dated Sep. 25, 2012, 6 pages.

Written Opinion for Application No. PCT/CA2013/050404, dated Aug. 21, 2013, 7 pages.

Office Action dated Sep. 22, 2016 in related U.S. Appl. No. 13/902,927, 9 pages.

Supplementary European Search Report for Application No. EP13797963.9, dated Dec. 16, 2015, 7 pages.

Europen Patent Application No. 13797963.9, Office Action dated Feb. 9, 2017.

Japanese Patent Application No. 2015514306, Office Action dated Feb. 28, 2017.

U.S. Appl. No. 13/902,927, Office Action dated Apr. 13, 2015.
U.S. Appl. No. 13/902,927, Office Action dated Oct. 16, 2014.
U.S. Appl. No. 13/902,927, Office Action dated May 26, 2017.

European Patent Application No. 05110579.9, Extended European Search Report dated Jan. 29, 2018.

European Patent Application No. 13797963.9, Communication pursuant to Article 94(3) EPC dated Jan. 4, 2018.

Japanese Patent Application No. JP2015514306, Office Action dated Jan. 30, 2018.

U.S. Appl. No. 13/902,927, Non-Final Office Action dated Jul. 13, 2018.

U.S. Appl. No. 13/902,927, Advisory Action dated Mar. 14, 2018.
Japanese Patent Application No. JP2015514306, Office Action dated Dec. 25, 2018.

* cited by examiner

ELECTROLYSER AND ENERGY SYSTEM

RELATED APPLICATION

This application is a National Stage Entry of International Application No. PCT/CA2013/050404, filed May 27, 2013, which is a non-provisional application of U.S. Provisional Application No. 61/652,263 filed May 28, 2012. U.S. Provisional Application No. 61/652,263 is incorporated by reference.

FIELD

This specification relates to electrolysers and methods of operating electrolysers in an energy system, for example to produce hydrogen for energy storage or fuel, or to provide electrical grid services.

BACKGROUND

European Patent EP 1 177 154 B1 is incorporated herein by this reference and describes an energy distribution network for providing an amount of hydrogen required from an electrolyser by a user. The network comprises an electrical energy source, an electrolyser and a controller. The controller receives and processes control inputs including data pertaining to a demand for hydrogen by a user. The controller is connected to the electrolyser and controls the generation of hydrogen by the electrolyzer based at least in part on the control inputs.

Canadian Patent CA 2 511 632 C is incorporated herein by this reference and describes an energy network having a plurality of power stations and a plurality of loads interconnected by an electricity grid. The loads may include electrolysers. The network has a controller that is connected to the stations and the loads. The controller is operable to vary the available power from the power stations or to adjust the demands from the electrolysers to provide a desired match of availability with demand. Hydrogen may be produced as a transportation fuel with specific verifiable emission characteristics.

INTRODUCTION TO THE INVENTION

The following discussion is intended to introduce the reader to the detailed description to follow, and not to limit or define any claimed invention.

An electrolyser operates within an energy system, for example to provide grid services, energy storage or fuel, or to produce hydrogen from electricity produced from renewable resources. The electrolyser may be configured to operate at frequently or quickly varying rates of electricity consumption or to operate at a specified power consumption.

In some cases, a process has steps of providing an electrolyser and receiving a series of dispatches indicating a specified power consumption for a period of time. The dispatches may occur at least once every 30 minutes. The electrolyser is operated according to the dispatches. Hydrogen produced by the electrolyser while operating according to the dispatches is discharged to a natural gas system.

In some cases, an energy system has an electrical grid, an electrolyser and a natural gas system. The electrolyser is operated to provide a grid service and discharges hydrogen into the natural gas system.

In some cases, a process has steps of providing an electrolyser, operating the electrolyser according to a dispatch order from an electrical grid operator or according to a grid services contract and discharging the hydrogen produced while so operating to a natural gas pipeline.

In some cases, a method of storing excess electrical energy in a grid has steps of converting the excess energy into hydrogen and injecting the hydrogen into a natural gas system.

In some cases, a method of making a virtual transfer of electricity has steps of consuming electricity through an electrolyser operating at a first location within an electrical grid to produce hydrogen, injecting the hydrogen into a natural gas system at a first location, extracting natural gas from the natural gas system at a second location, burning the natural gas to produce electricity, and supplying the produced electricity to a second location within the electrical grid.

In some cases, a method of marketing a virtual sale of hydrogen has steps of consuming electricity through an electrolyser to produce hydrogen, injecting the hydrogen into a natural gas system, measuring the amount of hydrogen injected into the natural gas system, measuring an amount of natural gas withdrawn from the natural gas system by a customer and invoicing the customer for an amount of hydrogen consumption equivalent to at least a portion of the amount of natural gas withdrawn. Optionally, the electricity may comprise electricity actually produced or deemed to have been produced from a renewable resource.

In some cases, an electrolyser has multiple stack assemblies each having a separate power supply. Optionally, the electrolyser has a controller adapted to operate the multiple stack assemblies at different rates of power consumption at the same time.

In some cases, an electrolyser has multiple stack assemblies that vent upwards to shared gas separators.

In some cases, an electrolyser has a controller and an electricity meter. The controller is adapted to operate a DC power supply so as to consume electricity at a pre-determined rate. Optionally, the controller may operate the DC power supply so as to consume electricity at a pre-determined rate when electricity is available at or below a predetermined price.

In some cases, a method of operating an electrical grid has steps of importing imbalance energy and consuming the imbalance energy through an electrolyzer connected to a natural gas system.

In some cases, a method of operating an electrical grid has steps of operating a generator to produce electricity in excess of an amount required to operate a grid and consuming the excess electricity in an electrolyser connected to a natural gas system. There may be a further step of comparing the marginal cost of the excess electricity less any cost of not producing the excess electricity to a market value of the hydrogen.

In some cases, a process has steps of consuming electricity through an electrolyser during a first period of time to produce hydrogen and injecting the hydrogen into a natural gas system and, during a second time period, burning natural gas to produce electricity.

In some cases, a natural gas system has a customer gas meter comprising a hydrogen concentration sensor. Data relating to flow rate and hydrogen concentration is converted into an equivalent flow rate of natural gas.

In some cases, a method of operating a natural gas fuelling station or natural gas fired electrical generating station has steps of measuring the concentration of hydrogen in natural gas withdrawn from a pipeline and adding hydrogen to produce a gas mixture with a specified hydrogen concentration.

In some cases, a method of operating a natural gas fuelling station or natural gas fired electrical generating station has steps of enriching a mixture of hydrogen and natural gas withdrawn from a pipeline and adding natural gas to produce a gas mixture with a specified hydrogen concentration.

In some cases, a method of operating an electrolyser has steps of receiving data related to a maximum amount of hydrogen that may be injected into a gas pipeline and a) controlling the electrolyser to consume no more than an amount of electricity that will produce the maximum amount of hydrogen, b) venting excess hydrogen or c) sending a signal to a grid operator indicating a corresponding maximum amount of hydrogen that can be produced. The data may include the flow rate of natural gas in the pipeline.

The elements and steps described in the cases above may be used in the combinations described in the cases, in a combination of any one of the cases described above with any element or step found in another case or in the detailed description to follow, or in other combinations.

DETAILED DESCRIPTION

Figure 1:
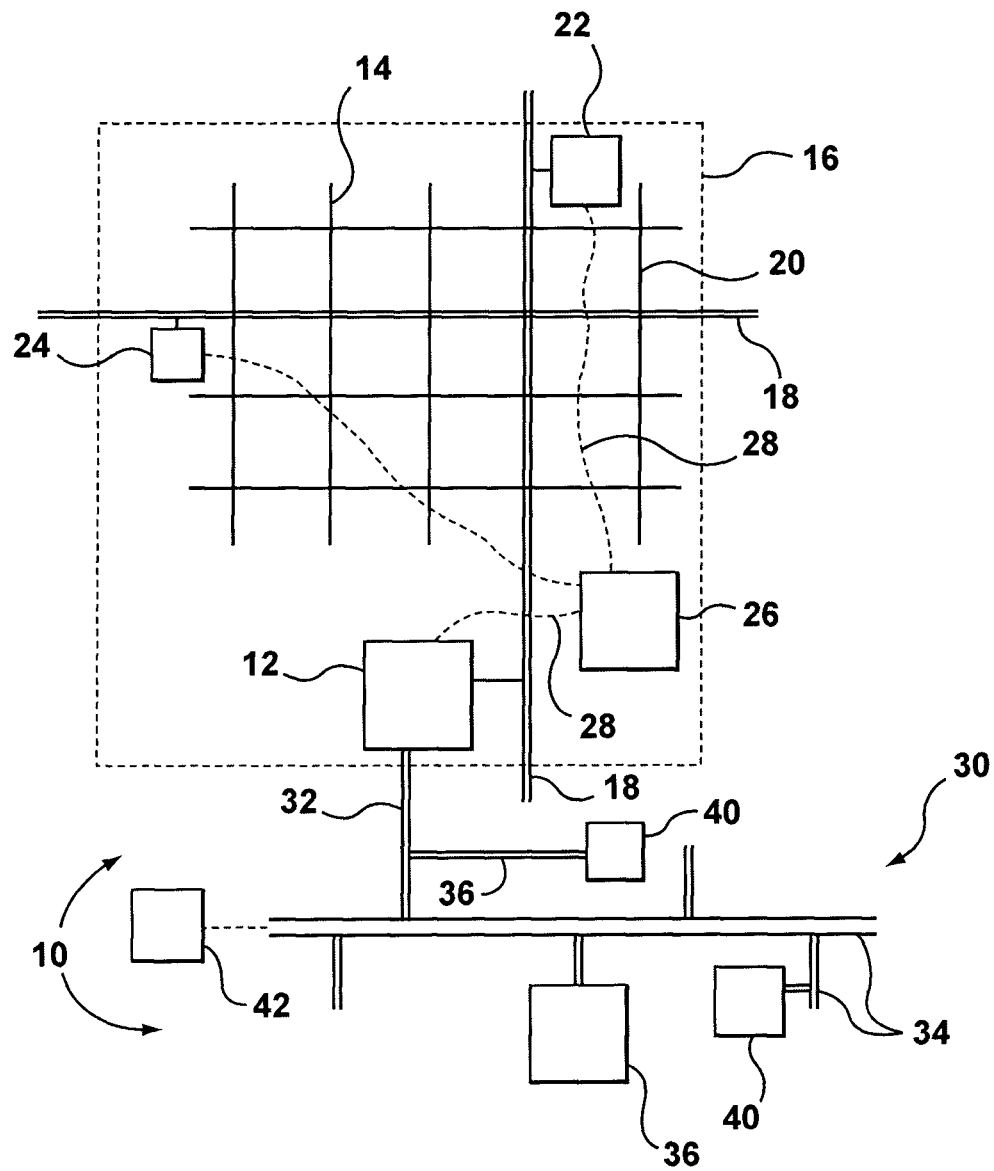
FIG. 1 is a schematic representation of an energy system comprising an electrolyser.

Water electrolysis, called electrolysis in this specification, converts electrical energy into chemical energy in the form of hydrogen. The hydrogen is most valuable when consumed as an essentially pure fuel or industrial chemical. However, the hydrogen also has value when blended with other gasses, the value tending to decline roughly with hydrogen concentration. The hydrogen can also be converted back into electricity. Further, in some situations the ability of an electrolyser to consume power can provide a valuable service, for example helping to balance or regulate an interconnected transmission system, also called an electrical grid. Hydrogen can be considered as a fuel or industrial chemical, but can also be seen as an energy storage or transporting medium. An electrolyser can be considered as a device for producing hydrogen, and also as a device for providing electrical grid services.

Grid services, which may also be called ancillary services or reserves, include various services that help maintain reliable operation of a grid. A grid system operator, sometimes call an independent system operator (ISO), electric system operator (ESO) or transmission system operator (TSO), may offer contracts for various kinds of grid services. Grid services include operations that assist an electrical grid operator in managing a control area, or that can be used to either reduce or facilitate energy transfers between control areas. Of particular interest herein, some grid service contracts require the owner of a variable load to respond to dispatch orders made by a grid system operator for the purpose of balancing total production and consumption on the grid, for example to avert or correct a short term imbalance. Electrical generators and controllable loads are both considered to be assets of the grid that can potentially provide grid services. The most significant loads in a grid tend to be industrial processes. However, industrial processes tend to operate most efficiently at steady states and so only some industrial processes may be used to provide grid services, and the potential value of their grid services is typically small.

In order to provide grid services, a process is required to operate at least with a variable rate of power consumption. The potential value of the grid services that can be provided by a variable load are increased a) if the rate, frequency, or size of the potential change in power consumption is increased, b) if the process is able to operate accurately at a specified rate of power consumption or c) if the process can be controlled by the grid operator.

The rate, frequency and size of a change in power consumption is relevant to the value of grid services because very few loads or power generating assets are able to alter their consumption or production quickly, frequently or by a large amount. Renewable energy generating assets such as solar panels or wind turbines fluctuate more frequently and rapidly, and to a greater extent, than conventional generating assets. Integrating high levels of renewable energy generating assets in a grid therefore requires a corresponding increase in the ability to alter other assets frequently and quickly, and to a corresponding degree.

The ability to operate accurately at a specified rate of power consumption is valuable since a load that can follow dispatch orders precisely helps provide faster and simpler resolution of imbalances than a less precise asset. In market based systems, reduced costs may only apply to a specified consumption.

Enhanced control by the grid operator would increase the range of problems that can be solved by a controllable load. For example, power to an ordinary interruptible load can be cut to prevent voltage in the grid from declining below a minimum in an emergency but then the grid operator does not have precise control over when the load will return. It would be of greater value to the grid operator if the duration of a load interruption was also controllable, and if the load could also be used to prevent an over-voltage in the grid. The value is higher if the grid operator's dispatch is essentially mandatory or almost always followed, rather than being subject to acceptance by the asset owner. Actual control, wherein the grid operator can send a control signal to the load controller rather than a dispatch order to a load operator, also provides enhanced value. Variable control, wherein the grid operator can dispatch an order or send a control signal specifying a desired rate of power consumption, provides more value than the mere ability to completely shut down a load.

A process is useful if it can provide any one or more of the advantages described above, but many of them are difficult to provide. Regarding the rate, frequency and magnitude of changes in power consumption, most industrial processes are constrained in their ability to respond to a requested change by one or more of a limited range of efficient process operation, mechanical components used in the process, and the need to produce a product. The mechanical components wear out or fail more frequently when they are not operated in steady states. The rate of product production may need to satisfy physical or market constraints. Regarding the ability to operate at a specified rate of power consumption, most industrial processes are controlled by specifying a production rate, not by specifying power consumption. Regarding control by the grid operator, this interferes with the industrial manager's ability to optimize their process according to other constraints.

In order to increase its potential to provide grid services, an electrolyser is preferably configured to have one or more of the ability to operate at frequently, quickly or widely variable rates or electricity consumption, to operate at a specified rate of power consumption, and to permit control by a grid operator.

One or more of these attributes can also be useful when not providing services to a typical large operating authority controlled grid. For example, in order to produce hydrogen from renewable energy, an electrolyser may be connected directly, or in a microgrid, to an electrical generator. The generator may comprise, for example, a wind turbine, a solar panel, a thermal solar device, or a generator burning biogas. In such a direct or minimally buffered system, the need for electrical energy storage can be reduced to the extent that the electrolyser can operate with whatever amount of power is being produced in real time.

In another example, an electrolyser may be connected to an electrical grid that allows for direct contracts between energy generators or loads, or that provides an auction or other market for dispatch orders or service requests from the grid operator. In these situations, a contracted low electricity price may apply only to a specified time and amount of energy purchased. Any discrepancy between the contracted and actual time or amount of electricity consumed is likely to result in an increased payment by the electrolyser operator. Since contracts may specify an electricity purchase at a rate varying in a step wise manner over time, electricity costs are minimized if the electrolyser can follow the specified steps accurately. This requires rapid changes between precisely specified consumption rates. Further, in systems where energy purchases can be verified or designated as coming from a renewable or low greenhouse gas generating source, claiming credits, offsets or other benefits may require a high level of correspondence between data relating to renewable energy production or purchase and data documenting actual electricity used.

The presence of a strong market for essentially pure hydrogen, or at least hydrogen at a higher concentration, may require balancing production restraints with the value of providing grid services. On the other hand, when the market for pure or high concentration hydrogen has been satisfied, or is likely to be satisfied incidentally by the provision of grid services, then providing grid services may be more valuable that providing any specific amount of further hydrogen production. Connecting the electrolyser to a natural gas system provides a market, and a physical storage and transportation system, capable of accepting essentially any quantity of hydrogen that might be produced by the electrolyser at essentially any time. The electrolyser can then be controlled to provide grid services of the highest value essentially without concern for the timing or amount of hydrogen production.

The further description to follow describes an energy system having an electrical grid, an electrolyser and a natural gas system. Some hydrogen produced by the electrolyser may be used for higher value markets, but hydrogen may also be injected into the natural gas system. The design of the electrolyser facilitates operating in a manner that provides grid services. The system facilitates extracting value from the hydrogen injected into the natural gas system.

FIG. 1 shows an energy system 10 having an electrolyser 12. The electrolyser 12 is connected to an electrical grid 14 within a control area 16. The electrical grid 14 is further connected to other electrical grid control areas through an interchange transmission line 18. Within the control area 16, the electrical grid 14 is also made up of internal transmission lines 20 of varying capacities. Portions of the interchange transmission lines 18 within the control area 16 can also be considered to be internal transmission lines 20.

The transmission lines 20 are connected to generators 22 and loads 24. The electrolyser 12 is also a load 24. A grid operator 26 is responsible for maintaining a balance of power production and consumption within the control area 16 and, if necessary, for arranging for imports or exports of electricity from or to other control areas through the interchange transmission lines 18. The grid operator 26 may have communication to varying degrees with one or more of the generators 22 and loads 24 through one or more communications links 28. The grid operator has control, to varying degrees, over at least some of the generators 22 and loads 24. Controlled generators 22 and loads 24 may be called assets.

The communications link 28 may, for example, allow the grid operator 26 to convey a dispatch order and to receive a message indicating acceptance, denial or modified acceptance of a dispatch order by the controlled asset 22, 24. Alternatively, the communications link 28 may convey an electronic signal directly to an asset 22, 24 in a machine usable form. Further alternatively, the communications link 28 may be indirect, for example in the nature of a market offering of a dispatch order or service request, or an offer to provide electricity from a specified generator 22 or the grid 14 generally at a specified cost, price or time. The asset 22, 24 may need to bid on, or contract for, the order, request or electricity and may receive confirmation of its obligation through an intermediary, such as a broker or automated auction system.

Other generators 22 or loads 24 may operate essentially outside of the control of the grid operator 26. Uncontrolled generators 22 or loads 24 are typically connected to the electrical grid through a meter which allows the grid operator 26 to at least know the production or consumption of generators 22 and loads 24 connected though the meter.

Alternatively, the grid 14 may take other forms. For example, in a remote community the grid 14 may be contained within a control area 16 having no interconnections with other grids 14 or control areas 16. In a captive or privately owned electrical system, or part of an electrical system, an electrolyser 12 may be connected through a transmission line 20 more nearly directly to a generator 22. In both of these cases, the functions of the grid operator 26 could be simplified to the point where these functions are essentially automated. The grid operator 26 may be a programmable logic controller, computer, or other programmable device rather than an agency or company employing people and using programmable devices.

In another alternative, a load aggregator may manage at least some aspects of the operation of multiple loads 24, including an electrolyser 12, and provide grid services based on the combined abilities of the multiple loads. The aggregator may manage multiple electrolysers 12, or a mixture of one or more electrolysers 12 and one or more other loads 24. In this case, although the load aggregator may be a private company, or other entity separate from the grid operator 26, the load aggregator can be considered to be part of the grid operator 26 and the electrolyser operator.

The grid operator 26 balances the production and consumption of electricity in the control area 16 such that, among other things, the voltage in the grid 14 is generally stable. In addition, the amount of electricity carried by each transmission line 18, 20 must be kept below the maximum capacity of each transmission line 18, 20. In FIG. 1, the grid operator 26 is responsible for managing both the balance of production and consumption and transmission constraints. Optionally, the transmission constraints may be controlled by one or more other operators that coordinate with the grid operator 26. In this case, these other operators may be considered to be part of the grid operator 26. The grid operator 26 may use the electrolyser 12 as a controllable load to aid in balancing or regulating the grid or to manage transmission constraints. For example, an excess of electricity produced in one area of the grid 14 can be consumed in the electrolyser 12 to prevent an over-voltage in the grid 14, to prevent electrical flow through a transmission line 18, 20 from exceeding its capacity, or both.

The grid operator 26 may also arrange transfers of electricity to or from other control areas 16 through an imbalance market or regulator. Grid operators 26 typically try to avoid such transfers. This is because times when the grid operator 26 needs to import electricity tend to be times when imbalance energy is costly. Times when the grid operator 26 must export energy tend to be times when the price of electricity is low or even negative.

The grid operator 26 can use the electrolyser 12 to absorb energy that would otherwise need to be exported or that can be purchased from another control area at a negative price. The grid operator 26 can also keep a generator 22 that is difficult or wasteful to throttle back in production to the extent that the electrolyser 12 can consume the electricity produced. Such use of the electrolyser 12 may be by way of a dispatch order by the grid operator 26, or by way of a market offering.

The energy system 10 includes a natural gas system 30. The electrolyzer 12 is connected to the natural gas system 30 through a hydrogen outlet 32. The natural gas system 30 comprises pipelines 34 of varying capacities which carry natural gas from a natural gas supply 42 to gas consumers 40. Natural gas system 30 may also comprise one or more reservoirs 36 for storing natural gas outside of the pipelines 34. Optionally, the hydrogen outlet 32 may be connected to a hydrogen pipeline 38 that carries hydrogen to a gas consumer 40 without passing through the natural gas system 30. The natural gas system 30 is shown in FIG. 1 to be apart from the control area 16 to simplify the Figure. The natural gas system 30 and control area 16 are likely to overlap on the ground. In particular, gas consumer 40 may also be either a load 24 or a generator 22 in the control area 16.

Electrolyser 12 receives electricity from a transmission line 20 and produces hydrogen, at least during some times. Some or all of the hydrogen may be injected from the hydrogen outlet 32 into a natural gas pipeline 34. In this way, electrolyser 12 stores energy in the energy system 10 by converting electrical energy into hydrogen and storing the hydrogen in the natural gas system 30. In some cases, the hydrogen may eventually be reconverted into electricity by being burned by a gas consumer 40 that is a natural gas fired generator 22. Converting electricity to hydrogen through an electrolyser 12 in one part of the control area 16 and generating corresponding electricity from a natural gas fired generator 22 in another part of the control area 16 provides a virtual transfer of electricity through the natural gas system 30.

Regardless of whether or when the hydrogen actually reaches a natural gas fired generator 22 or not, the hydrogen displaces natural gas consumption and reduces the need to input natural gas into the natural gas system 30. The hydrogen can be deemed in a management, billing, tracking, tax, carbon offset, carbon credit or other system or process to have been burned at any time by any gas consumer 40.

Figure 2:
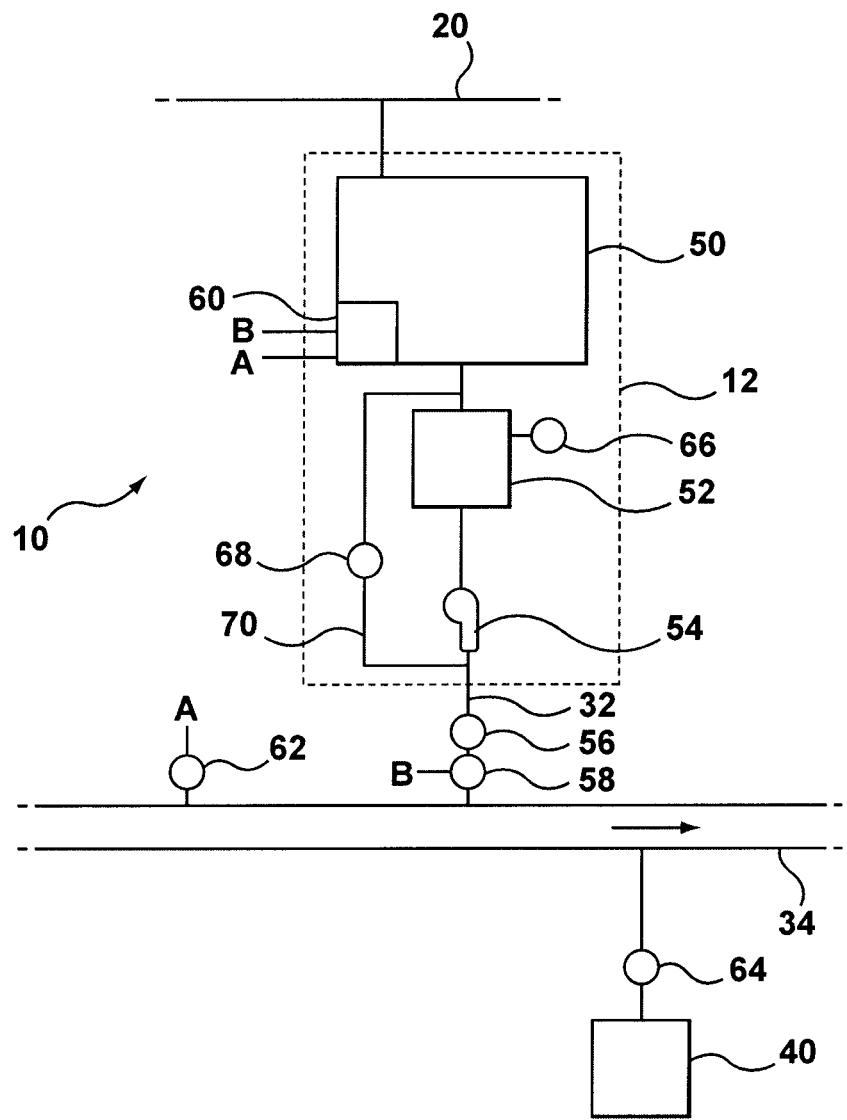
FIG. 2 is a schematic representation of a portion of the energy system of FIG. 1 including a connection between the electrolyser and a gas pipeline.

FIG. 2 shows further details of a portion of the energy system 10, particularly the connection between the electrolyser 12 and the natural gas system 30. The electrolyser 12 shown comprises a core 50, interim storage 52 and a compressor 54. Interim storage 52 and compressor 54 are preferred but optional since some electrolysers 12 can be operated to output hydrogen at a pressure high enough to be injected into the natural gas system 30. However, direct connection between the core 50 and a natural gas pipeline 34 under conditions of variable power consumption is likely to cause a high persistent pressure or pressure fluctuations in the electrolyser stacks. Both conditions increase the likelihood and magnitude of hydrogen leaks but can be avoided by producing hydrogen at less than pipeline pressure and providing a compressor 54.

The division of components shown in FIG. 2 between the core 50, the remainder of the electrolyser 12, and the area outside of the electrolyser 12 is arbitrary. For example, interim storage 52 and the compressor 54 can be integrated into the balance of plant in the core 50. Alternatively, the interim storage 52 and compressor 54 can be located outside of a building housing the electrolyser 12 or even in a remote location.

In FIG. 2, the electrolyser core 50 produces hydrogen at less than the pressure in a natural gas pipeline 34 of the natural gas system 30. For example, the core 50 may produce hydrogen at about 100 psig. Interim storage 52, if provided, is intended primarily to aggregate produced hydrogen so that compressor 54 does not need to be operated as frequently or at a rate matching the rate of hydrogen production, and to provide a buffer against creating suction in the core 50. Compressor 54 may be, for example, a positive displacement pump. A storage pressure gauge 66, in fluid communication with the interim storage 52, monitors the pressure in the interim storage. Compressor 54 is turned on when the pressure gage 66 indicates that a high pressure set point has been reached. Compressor 54 is turned off when the pressure gage 66 indicates that a low pressure set point has been reached. A recycle loop 70 with a regulator valve 68 may be added to prevent the compressor outlet pressure from exceeding a predetermined maximum.

Hydrogen outlet 32 feeds into the gas pipeline 34 through an output valve 56 and a gas meter 58. The output valve 56 may be, for example, a back pressure regulator that opens only when the hydrogen pressure exceeds a minimum pressure selected to be above the likely maximum pressure in natural gas pipeline 34, for example 500 to 800 psig. Optionally, the output valve 56 may sense the actual pressure in the natural gas pipeline 34 electronically or pneumatically and adjust the minimum pressure to follow the pressure in the natural gas pipeline 34, plus a safety factor. This avoids excess hydrogen compression which consumes energy. The gas meter 58 records the amount of hydrogen that flows into the gas pipeline for one or more billing or management uses. Optionally, there may be two or more gas meters 58, one owned and used by the operator of the electrolyser 12 and one owned and used by the operator of the natural gas system 30. Alternatively, both of these operators may be one company, or they may share date from a single gas meter 58. The gas meter 58 may be read manually from time to time but preferably the gas meter 58 is capable of transmitting data, typically at regular polling intervals.

The electrolyser core 50 includes a water-hydrogen separator and a gas drier. A humidity sensor in the electrolyser 12 checks that the hydrogen has been reduced to gas pipeline standards before it leaves the electrolyser 12. An oxygen sensor checks to make sure that the hydrogen does not contain oxygen in excess of the electrolyser safety standards or the gas pipeline standards. In addition to these internal sensors, the natural gas system operator may require its own oxygen and humidity sensors near the point of entry into the gas pipeline 34. Optionally, additives may be added to the hydrogen, for example anti-embrittlement additives to improve the compatibility of the hydrogen with materials in the natural gas system 30 or materials used by the gas consumer 40.

Electrolyser 12 has one or more controllers 60 that perform one or more control processes. In one control process, the controller 60 determines a maximum rate of hydrogen injection over time and prevents the electrolyser 12 from injecting hydrogen at more than the maximum rate. The maximum rate may be determined by a preselected maximum hydrogen concentration, for example 2% to 20% by volume, that applies to all components of the natural gas system. In this case, the maximum hydrogen concentration can not be exceeded in the natural gas pipeline 34 that receives the hydrogen. The rate of hydrogen injection at any time therefore can not exceed a maximum percentage of the natural gas flow rate in that natural gas pipeline 34 at that time. To check for this condition, the controller 60 receives a signal A from a natural gas pipeline flow meter 62 connected to the pipeline 34 and a signal B from the gas meter 58. Assuming that there are no upstream electrolyser 12 or the producer of hydrogen, the controller 60 compares the flow indicated by signal B to the flow indicated by signal A multiplied by the maximum percentage.

Various other methods of determining a maximum hydrogen injection rate, or whether a maximum allowable hydrogen concentration has or will be exceeded, can also be used. For example, if there is an upstream hydrogen producer, the controller 60 can be connected to a hydrogen sensor upstream of the hydrogen outlet 32 and further consider the hydrogen concentration in the gas pipeline 34 upstream of the hydrogen outlet 32. Alternatively, the controller 60 may be connected to a hydrogen sensor downstream of the hydrogen outlet 32 to check directly whether the hydrogen concentration exceeds the maximum hydrogen concentration. In other alternatives, the controller 60 or an electrolyser operator may respond to information obtained from an entity that manages the natural gas system 30 indicating the natural gas flow rate in the gas pipeline 34 or indicating directly, or after further calculation, whether the natural gas system 30 can accept more hydrogen. In a case where information is obtained from an entity that manages the natural gas system 30, that entity may be able to determine a maximum rate of injection that is not limited by a single maximum hydrogen concentration that applies to all components of the natural gas system 30. In this case, the maximum rate of injection may consider, for example, dilution downstream of the gas pipeline 34 caused by a reservoir 36 or incoming flow of natural gas. Optionally, a hydrogen pipeline 38 may transport hydrogen directly to a reservoir 36 in which case whether further hydrogen injection is permitted may be determined by whether the hydrogen concentration in the reservoir 36 exceeds a selected maximum concentration.

The controller 60 compares the rate of hydrogen production, as indicated by gas meter 58 or an internal gas meter, to the maximum rate of injection continuously or at polling intervals. As long as the rate of hydrogen production remains below the maximum rate of injection, the rate of production can be determined by other factors. However, if the rate of hydrogen production exceeds the maximum rate of injection, then the controller 60 may send an alert to an operator or directly reduce the power consumption of the electrolyser 12, for example by way of a signal sent to a DC power supply within the electrolyser 12. Optionally, the controller 60 or the electrolyser operator may also send a signal to the grid operator 26 indicating that the electrolyser 12 is reducing its power consumption.

The electrolyser 12 is preferably sized relative to the typical flow in gas pipeline 34 such that the maximum hydrogen injection rate is rarely exceeded. Alternatively, a hydrogen pipeline 38 may be used to connect the electrolyser 12 to a distant but larger gas pipeline 34 or directly to a reservoir 36. Any interim storage 52 may also be used to allow some hydrogen to be produced at some times at a rate exceeding the maximum injection rate. However, the controller 60 may still need to reduce the net rate of hydrogen production at some times. The net rate of hydrogen production can be reduced by reducing the actual rate of hydrogen production or by venting some of the hydrogen that is produced to the atmosphere. While venting hydrogen is not desirable, the hydrogen recombines with vented or atmospheric oxygen to form water and does no material harm to the environment.

Reducing the actual rate of hydrogen production typically requires reducing the rate of electricity consumption. While reducing electricity consumption is often acceptable, in some instances the electrolyser 12 may be under a contract or dispatch order to consume a predetermined amount of electricity, or the electrolyser 12 may be performing grid services. In these cases, an unplanned reduction in electricity consumption may harm the grid 14 or cause economic harm to the grid operator 26 or electrolyser operator. In these cases, the electrolyser operator may prefer to vent hydrogen.

To avoid unplanned reductions in electricity consumption or hydrogen venting, the controller 60, the electrolyser operator or another person or thing may forecast the maximum injection rates expected to exist over a period of time. The forecast can be based on one or more of current flow rate in the gas pipeline 34, a current trend in the flow rate through the gas pipeline 34, historical data, or information received from the natural gas system operator. In cases where the electrolyser 12 is under some level of control by the grid operator 26, or is completely controlled by the grid operator 26, the forecast may be converted into an amount of available power consumption and provided to the grid operator 26. Alternatively, the electrolyser operator or controller 60 may refuse or modify a dispatch order or request for grid services from the grid operator 26 based on the forecast. In other cases, the electrolyser operator can bid on energy contracts based on the forecast. The electrolyser operator may apply a factor of safety to the forecast, accept the possibility of hydrogen venting if the forecast is wrong, or even commit to a power consumption dispatch or contract that is forecasted to cause a need to vent hydrogen.

Gas meter 58 records the amount of hydrogen added to the pipeline 34. In a sale of actual hydrogen, the operator of the natural gas system 30 may pay the electrolyser operator for the hydrogen based on the meter 58 readings at a price fixed by contract or regulations. The hydrogen mixes with the natural gas and is thereafter considered to be natural gas. Optionally, a consumer gas meter 64 between a pipeline 34 and a consumer 40 may include a hydrogen concentration sensor. The meter 64, or a computer operated by the natural gas system operator, may adjust the actual gas flow rate to provide a flow rate of natural gas without hydrogen having an equivalent heating value for billing purposes. Alternatively, the natural gas system operator may provide an adjustment to a set of consumers 40 downstream of the electrolyser 12 based on an estimated reduction in the heating value of gas flowing through meter 64 resulting from the hydrogen injected into the pipeline 34.

An actual sale of hydrogen may also be made to a gas consumer 40 by calculating the amount of hydrogen actually consumed by a customer using a calculated or measured flow rate and hydrogen concentration information. Hydrogen can also be sold to a consumer 40 through a hydrogen pipeline 38 or by way of tanker trucks.

Alternatively, a virtual sale of hydrogen can be made to a consumer 40. The amount of gas withdrawn by various consumers 40 is recorded by consumer gas meters 64. Some or all of the gas consumed by each consumer 40 in an aggregate amount less than or equal to the amount of hydrogen produced, as recorded by gas meter 58, is deemed to be hydrogen. The consumers 40 pay the electrolyser operator or the natural gas system operator for the deemed hydrogen. The hydrogen production and deemed consumption may or may not balance in a given time period. If the production and deemed consumption are not the same, hydrogen is deemed to be stored or extracted from the natural gas system 30 during that time period.

Optionally, a hydrogen reseller may contract to buy hydrogen from the electrolyser operator and to sell hydrogen to consumers 40. Purchases by the hydrogen reseller are paid to the electrolyser operator and subtracted from the flow recorded through gas meter 58. Any remaining hydrogen may be sold to the natural gas system operator or other customers. A consumer 40 pays the hydrogen re-seller for some or all of the gas use indicated by use meter 64. The cost of any remaining gas used by the consumer 40 is paid to the natural gas system operator.

In any of these processes, a fee may also be paid to the natural gas system operator for transmitting or storing the hydrogen. The hydrogen may be billed as hydrogen or as an equivalent amount, by heating value, of natural gas.

The hydrogen can also be deemed to have been produced, or tagged, with attributes based on the source of the electricity used to produce it. For example, rather than being connected to a grid 14, an electrolyser 12 may be connected only to a wind farm, solar facility or other specific generator 22. In a more likely scenario, the electrolyser 12 can be connected to a transmission line 20 between a generator 22 and the remainder of the grid 14. Assuming that there is no flow, or net flow, of electricity from the grid 14 to the transmission line 20, the hydrogen can be tagged as having been produced by the specific generator 22. Even if there is a flow or net flow of electricity flowing from the grid 14, some of the hydrogen can be tagged as having been produced by the specific generator 22 based on its electricity generation. In cases where electricity contracts are sold in a market and the contracts designate the generator 22, a corresponding amount of hydrogen can be tagged with having been produced by the designated generator 22.

The tagged hydrogen can be sold, in a real or virtual sale, under conditions considering the tag. For example, a consumer 40 may agree to pay a higher price for hydrogen tagged as being produced by a generator 22 operating from a renewable energy source such as wind, solar, biogas or syngas. Alternatively, carbon credits or offsets, tax credits or other economic or regulatory attributes of renewable energy may be associated with the tagged hydrogen. Data relating to the production and use of the tagged hydrogen is collected in a computer and used to calculate an invoice for the sale of the tagged hydrogen or a record of the transfer of its other economic or regulatory attributes. When a hydrogen re-seller is involved, the re-seller may make a virtual purchase of only the tagged hydrogen. The attributes of the tagged hydrogen are transferred to the re-seller who may then transfer those attributes to a customer. In this way, the re-seller may offer a virtual sale of hydrogen that has been produced only from renewable resources. This virtual sale might be satisfied with the delivery in fact of natural gas while the actual hydrogen displaces natural gas use elsewhere. Alternatively, the re-seller may allow the customer to claim a carbon credit, tax credit, carbon offset or other benefit from having purchased the tagged hydrogen.

The electrolyser 12 is preferably connected to a high capacity transmission line 20. In particular, the electrolyser 12 may be connected to, or near, an interchange transmission line 18. Since interchange transmission lines 18 are set up to allow electricity to be sold to another control area through an imbalance market, the grid 14 is configured to be able to route excess electricity to these lines 18. An electrolyser 12 positioned near an interchange line 18 is in a location suitable for consuming excess power that the grid operator 26 would otherwise need to sell, often at negative pricing, in the imbalance market. Such an electrolyser 12 is also positioned to allow a grid operator 26 to purchase, or approve a purchase, of incoming imbalance energy through an interchange line 18 without overloading internal transmission lines 20.

The electrolyser 12 may be operated primarily to provide grid services when the price of natural gas does not make converting electricity to natural gas profitable by itself. In this mode, hydrogen is produced and sold as a by-product of providing grid services but is not produced at other times. The electrolyser is off unless dispatched on, or unless electricity is offered at a very low rate during some particular period of time. The electrolyser 12 may be contracted to operate as required by the grid operator 26 or put under the direct control of the grid operator 26. When providing grid services having a time scale of 5 minutes or more, the grid operator 26 may communicate with an electrolyser operator by way of dispatch orders and confirmation messages. A dispatch order may be delivered by telephone, email or dedicated data link and specifies one or more desired rates of consumption during one or more future times periods. A confirmation message, delivered by the same or another form of communication, indicates that the electrolyser 12 can and will consume power as specified in the dispatch order or indicates a portion of the dispatch order that the electrolyser 12 can comply with. During the time period of the dispatch order, information from a meter 84 (see FIG. 3) recording actual consumption by the electrolyser 12 is also sent to the grid operator 26.

When the electrolyser 12 is providing grid services having a shorter time scale, such as frequency regulation, commands and confirmation messages are sent directly between the grid operator 26 and the controller 60 of the electrolyser. These messages may be sent over a dedicated communication link 28.

In some situations, the market price for hydrogen makes it profitable for the default condition of the electrolyser to be full power operation, at least while there is sufficient demand for the hydrogen. For example, on islands such as Hawaii and Singapore, natural gas must be imported by tanker or produced on the island and the price of natural gas is typically high. There is also some market for hydrogen as a fuel for vehicles, as a heating fuel, as an industrial chemical, in wastewater treatment, in syngas upgrading, as an additive to natural gas used in vehicles, and as an additive for natural gas burned in natural gas fired electrical generating stations. Hydrogen can also be used to mix with propane to provide a blended gas with a WAUB index similar to natural gas. In these cases, the electrolyser 12 can provide grid services by way of being an interruptible load or being controlled for load destruction or apparent power production.

Figure 3:
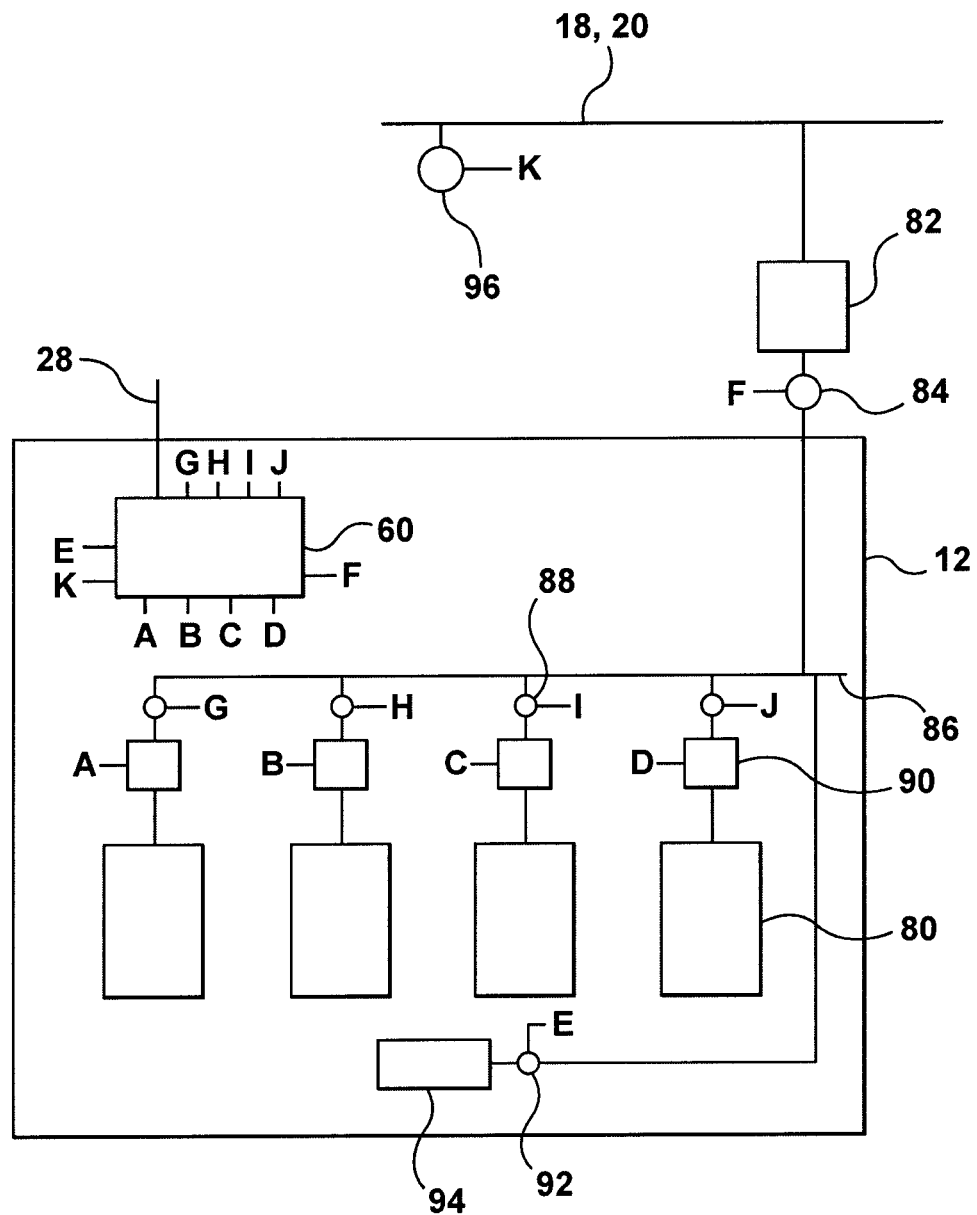
FIG. 3 is a schematic representation of various electrical components of the electrolyser of FIG. 1.

FIG. 3 shows various electrical components of the electrolyser 12. The electrolyser 12 has a set of stack assemblies 80. Each stack assembly 80 may in turn contain multiple electrolyser stacks. The stacks may be, for example, alkaline or polymer electrolyte membrane (PEM) stacks. PEM stack as preferred since they are able to operate at near zero voltage, whereas alkaline stacks typically cannot operate below a significant percentage, for example 50%, of their maximum power consumption. PEM stacks also have a greater power density and tend to be designed to produce hydrogen at higher pressures. On the other hand, some alkaline stacks, such as those sold by Hydrogenics Corporation, are designed to be self-pumping. This self-pumping feature can be useful when providing grid services since it avoids the need to frequently alter the speed of a water pump or flow control valve.

Electrical power is provided to the electrolyser 12 from the grid 14 from a transmission line 18, 20 through an AC-AC step down transformer 82. The step down transformer 82 reduces the voltage in the transmission line 18, 20 to the standard step-down voltage in the control area 16, for example 120 V or 220 V. Total power consumption is tracked by a primary electrical meter 84. AC electricity is made available to the various components within the electrolyser 12 through a main bus 86.

Each stack assembly 80 is separately connected to the main bus 86 through an associated DC power supply 90 and stack sub-meter 88. The DC power supply 90 should preferably have a wide voltage range, a large current capacity, and a durable variable output mechanism. One suitable power supply is a Thyrobox H2™ power supply made by AEG Power Solutions. These power supplies have a DC output of between 1V DC and 400 V DC at up to 15,000 Amps and have Thyristor based variable output mechanisms. The Thyristor mechanism is a solid state device, which avoids moving parts that might otherwise wear out with rapid power changes continuing for long periods of time. Multiple power supplies may be provided to each stack assembly 80 if required to provide adequate power.

The electrolyser 12 also has a balance of plant 94, parts of which will be described further in relation to FIG. 4. Power for the balance of plant 94 is provided from the main bus 86 through a balance of plant sub meter 92.

When operating to provide grid services, for example frequency regulation, the master controller 60 attempts to operate the DC power supplies 90 such that the electrolyser 12 consumes a specified amount of power. The amount of power may be specified by an operator considering a dispatch or market offering through communications link 28, or by direct control of the grid operator 26 through communications link 28. The controller 60 may reduce the power consumed by the DC power supplies 90 by the amount of power required by the balance of plant 94. This amount of power may be estimated, for example as a percentage of the total specified power consumption, or determined by polling the balance of plant meter 92. The remaining power to be consumed is divided between the DC power supplies 90. Readings from stack sub-meters 88 may be used in inner control or feedback loops to adjust the requested output from each power supply 90 such that the actual power consumed, as determined by a stack sub-meter 88, matches the intended portion of the specified power consumption. These inner loops may also operate in sub-controllers connected to each DC power supply 90 and its associated stack sub-meter 88. Optionally, readings from the primary meter 84 may be used in an outer control or feedback loop to adjust control signals such that the total power consumed by the electrolyser 12, as determined by primary meter 84, matches the specified amount. In frequency regulation, for example, the grid operator 26 may send a series dispatches, each dispatch indicating the required power consumption for a specified period of time. The controller 60 attempts to match the dispatches with the timing and amount of actual power consumption as closely as possible or at least within a range of tolerance, for example within 10% of the specified power consumption for at least 90% of the applicable time period. An acceptable tolerance for following the dispatches may be specified by the grid operator 26 directly or by way of a penalty for operation outside of the stated tolerance.

Providing multiple stack assemblies 80 with associated power supplies 90 allows multiple stack assemblies 80 to be operated at different power consumptions at the same time. The controller 60 may be programmed to implement a number of modes of operation. The controller 60 selects between modes of operation at the request or control of an operator, or as a programmed response to a specified grid service commitment or to forecasted or contracted future power consumption or price.

For example, the electrolyser 12 may provide grid stabilizing services, for example primary or secondary frequency regulation services, in which the specified power consumption is expected to vary over a time period of 5 cycles to 5 or 10 minutes, or over longer periods of time but in an unpredictable manner. For example, under a primary frequency regulation services contract, the specified power consumption may vary every 4 seconds, which is the time between automatic generation control (AGC) signals in some North American grids 14. Under a secondary frequency regulation services contract, the specified power consumption may vary every 5 to 10 minutes. In these cases, the controller 60 operates all of the stack assemblies 80 at about the same power level. In this way, the total size of a power fluctuation is spread out over the maximum number of stack assemblies 80 to provide the minimum rate of change in each stack assembly 80. Any excess stack assemblies 80 may be shut down or put in standby. For example, for a 1 MW electrolyser 12 having five stack assemblies 80, a contract to provide 0.5 MW of primary frequency regulation is met by operating three stack assemblies 80 at about the same power level as required to satisfy the contract. The two remaining stack assemblies 80 as shut down or put on standby. However, these two remaining stack assemblies may be activated if an opportunity arises to purchase electricity at a price low enough to profit from producing additional hydrogen.

When providing secondary or tertiary frequency regulation services, the specified power consumption is expected to vary over a time period of 5 to 30 minutes, for example 5 to 10 minutes for secondary regulation and 15 to 30 minutes for tertiary regulation. The maximum size of the variation over a period of time may also be predictable. In this case, and in the case of other services with infrequent or predictable changes in specified power consumption, the controller 60 determines a number of stack assemblies 80 required to produce a nominal base line consumption, being the minimum consumption expected over a frequency regulation period, which can be some or all of the time covered by a grid services contract, and operates these stack assemblies 80 at full power. The controller also predicts a second number of stack assemblies 80 sufficient to provide additional consumption expected during the frequency regulation period, and operates these stack assemblies 80 with variable power consumption. In this way, the effect of oscillations or errors in the control loops is reduced. Further, operation at a steady state typically causes less wear on the stack assemblies 80. Any remaining stack assemblies 80 are shut down or put on standby. However, these two remaining stack assemblies may be activated if an opportunity arises to purchase electricity at a price low enough to profit from producing additional hydrogen.

For example, a 1 MW electrolyser 12 may have five stack assemblies 80. The electrolyser 12 can provide up to 0.2 MW of active frequency regulation from one stack assembly 80 while also consuming between 0 and 0.8 MW of base line consumption in the four remaining stack assemblies 80. While consuming 1 MW, all stack assemblies 80 are in operation. If the required base line consumption is reduced to 0.6 MW, then one stack assembly 80 can be shut down or put into a standby mode, or operated to provide active frequency regulation. When providing base line consumption, it is preferable to have shut down or put into standby as many stack assemblies 80 as possible rather than spreading the base line consumption over all stack assemblies 80 not needed for active frequency regulation. However, if the electrolyser 12 is required to provide 1 MW of frequency regulation with no base line consumption (ie. the specified power output is expected to fluctuate by 0.8 MW rapidly or in a manner that is difficult to predict), then all stack assemblies 80 operate at similar fluctuating power levels. As will be described further in relation to FIG. 4, despite the variable electricity consumption and hydrogen production, the hydrogen is produced at an essentially constant pressure.

In another mode of operation, the electrolyser 12 is operated to provide a hydrogen production or energy arbitrage mode. At any time when electricity is available at a price at which the production of hydrogen produces a profit, then all stack assemblies 80 operate at full power. When the price of electricity is too high to profit from the sale of hydrogen, then all stack assemblies 80 are shut down or put in standby mode. Optionally, a potential profit from producing hydrogen can be compared to profit from providing a grid service. The expected profit from providing grid services can be increased by an estimated value of the hydrogen that will be produced while providing the grid service. When the value of grid services is higher, a sufficient portion of the electrolyser capacity is allocated to providing the grid service. Any remaining stack assemblies 80 can be operated in hydrogen production or arbitrage mode. Optionally, when one or more of the stack assemblies 80 are operating in a hydrogen production or energy arbitrage mode, the controller 60 may also be programmed to start and stop the one or more stack assemblies 80 such that the one or more stack assemblies 80 are on while electricity is available at or below a specified price.

In an automatic grid service mode, the controller 60 may be linked to a grid voltage meter 96 or other grid condition sensor. If the grid voltage is rising or high, the controller 60 increases power consumption until the maximum power consumption is reached or the grid voltage stabilizes within a target range. Conversely, if the grid voltage is dropping or low, the controller 60 decreases power consumption until the grid voltage stabilizes within the target range.

Figure 4:
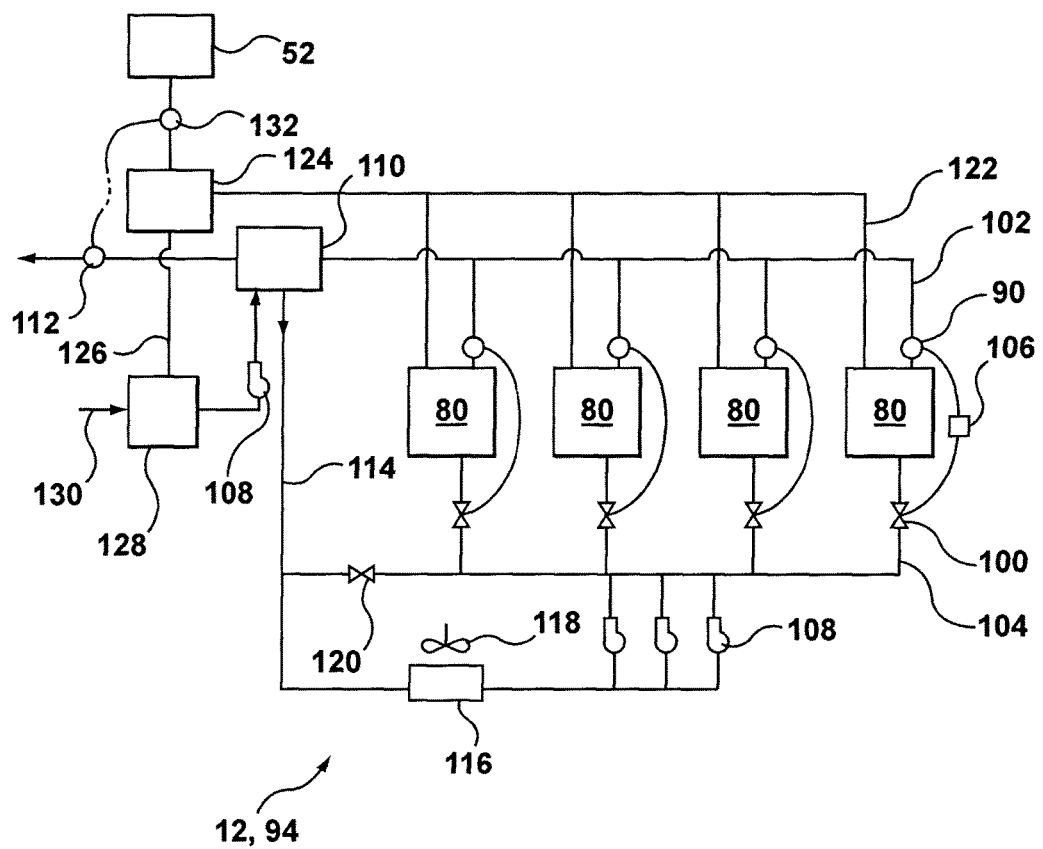
FIG. 4 is a schematic representation of hydraulic and gas circuits of the electrolyser of FIG. 1.

FIG. 4 shows various elements of the balance of plant 94 of the electrolyser 12. Each stack assembly 80 has a thermostat 90 located in the stack assembly 80 or in an oxygen outlet 102. The thermostat 90 is connected to a flow control valve 100 in a water input line 104 leading to the stack assembly 80. A stack temperature controller 106, or another controller such as the master controller 60, modulates the flow control valve 100 to maintain the temperature of the stack assembly within a specified range. The flow of water is provided from a set of parallel pumps 108. The number of pumps 108 is one more than the number required to provide the maximum design water flow such that a pump 108 may be removed for servicing. By using the flow control valves 100 to control the temperature of individual stack assemblies 80, fluctuations in the operating speed of the pumps 108 are reduced and a single pump set can be used for multiple stack assemblies 80. Water flow through a stack assembly 80 also shuts down and restarts automatically as the stack assembly 80 transitions between off or standby and operating modes.

Excess cooling water is produced with the oxygen and travels from the oxygen outlet 102 to an oxygen separator 110. The pressure within the oxygen separator 110 is maintained at a generally constant level by an oxygen regulator 112. The separated water 114 returns to the pumps 108 through a cooling device, such as a radiator 116 and fan 118. The speed of the fan 118 is controlled to produce a desired temperature in the water reaching the pumps 108. A recirculation valve 120 is modulated in response to the current drawn by pumps 108 to allow water recirculation in the event that closing flow control valves 100 are stressing the pumps 108. While the speed of the pumps 108, or the number of pumps 108 operating, may also be reduced, repeatedly varying the speed of the pumps 108 causes them to wear rapidly.

Hydrogen is produced from a hydrogen outlet 122 of each stack assembly and travels to a hydrogen separator 124. Separated water 126 flows to a make up water tank 128. Make up water tank 128 also receives deionized make up water 130 when required. A pump 108 pumps make up water into the water recirculation circuit when the water level in the oxygen separator 110 drops to a specified minimum.

The pressure in the hydrogen separator 124 is determined by a hydrogen regulator 132. Produced hydrogen is collected in the interim storage tank 52. The pressure in the interim storage tank 52 is always less than the pressure in the hydrogen separator 124. However, referring back to FIG. 2, a compressor 54 is operated such that pressure in the interim storage tank is not drawn down to less than a specified part, for example 80%, of the gauge pressure in the hydrogen separator 124 to reduce losses in pressure energy. Oxygen leaving the electrolyser 12 may pass through a pressure recovery turbine or other device to recover its pressure energy.

The seals in the stack assemblies 80 may wear out due to the product of the pressure applied against them over time, and due to the fluctuations in the pressure applied against them. When the electrolyser 12 is used to provide grid services, the power applied to the stack fluctuates frequently and it is beneficial to avoid corresponding fluctuations in pressure.

Pressure against the seals is kept more generally constant by venting multiple stack assemblies 80 to common gas separation vessels 124, 110. Particularly when one or more of the stack assemblies 80 are producing hydrogen, the pressure regulators 112, 132 are able to provide stable pressures in the gas separation vessels 124, 110 while permitting flow through the stack assemblies 80. Variations in the gas produced by one stack assembly 80 are dampened by the size of the gas separation vessels 124, 110. The system as a whole therefore requires fewer pressure regulating devices, and the pressure regulating devices can have reduced movement, relative to a plant having gas separation vessels for each stack assembly. Pressure following between the oxygen regulator 112 and the hydrogen regulator 132 maintains almost equal pressures on both sides of the membranes of the stack assemblies 80.

The gas outlets of the stacks are located on the top of the stacks and water flows upwards through the stacks. When a stack is powered down, its residual gas bubbles flow upwards to the gas separators 110, 124. Water drains down from the gas separators 110, 124 into the stack assemblies 80. The water in the stacks prevents residual hydrogen and oxygen from reacting and either degrading the materials, for example the catalysts, in the stack or converting the stack into a fuel cell. The water also preserves the pressure in the stack to reduce pressure fluctuations. In this way, power can be reduced to a stack without requiring other changes in the balance of plant.

Figure 5:
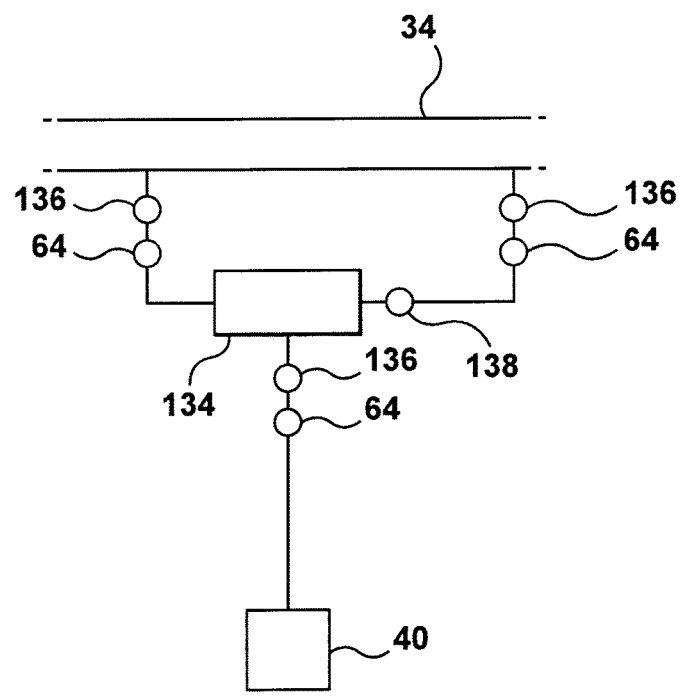
FIG. 5 is a schematic representation of an optional hydrogen enriched gas withdrawal system for the energy system of FIG. 1.

Referring to FIG. 5, a consumer 40 may extract gas from the pipeline 34 through a hydrogen enriching extraction device 134. Multiple meters 64 allow the amount of gas withdrawn from the pipeline 34, returned to the pipeline 34, and delivered to the consumer 40 to be measured. Isolation valves 136 optionally allow the extraction device 134 to be operated in a batch mode. A compressor 138 allows hydrogen depleted gas to be returned to the pipeline 34.

The consumer 40 may be, for example, a natural gas fuelling station or a natural gas fired electrical generating station. A variable low concentration, for example up to about 5%, of hydrogen can be added to natural gas without materially changing the operation of typical gas fired appliances such as a household furnace. Engines, however, can be more sensitive to changes in the composition of their fuel. Natural gas engines include gas fired turbines used to generate electricity and internal combustion engines in vehicles. However, a moderate concentration of hydrogen, up to about 15%, can be beneficial to the operation of a natural gas engine and can reduce emissions of carbon dioxide and pollutants.

The control system of a natural gas engine may sense the hydrogen concentration of the fuel, the operation of the engine in response to the hydrogen content of the fuel, or both, and react accordingly. Alternatively, at a vehicle fuelling station or in a supply system for a natural gas fired turbine, natural gas may be provided enriched with hydrogen in one or more grades of generally constant concentrations greater than what is present in the pipeline 34.

For example, a 5% or 10% hydrogen enriched natural gas product can be produced by measuring the concentration of hydrogen in natural gas withdrawn from the pipeline 34 and adding a required amount of hydrogen to reach the desired concentration. Optionally, the desired amount of hydrogen can be determined by monitoring a hydrogen concentration sensor in addition to, or instead of, pre-calculating the required amount. In this case, measuring the concentration of hydrogen in natural gas withdrawn from the pipeline 34 can be omitted. The additional hydrogen can be provided by hydrogen pipeline 38, tanker truck, on site electrolysis, or on site conversion of natural gas, for example by steam reformation. The electrolyser 12 may also be co-located with a fuelling station or electrical generating station, or connected by a hydrogen pipeline 38, to provide hydrogen for natural gas enriching directly.

Alternatively, a mixture having an increased or decreased concentration of hydrogen can be extracted from the pipeline 34 through the extraction device 134. If the extracted mixture has more than the desired hydrogen concentration, the hydrogen can be diluted to the target concentration with non-enriched gas taken from the pipeline 34.

The extraction device 134 can remove hydrogen enriched gas for example by a hydrogen selective membrane such as a membrane made of palladium or a palladium silver alloy. The pipeline gas can also be compressed to separate the gasses by liquefying only one of them. Hydrogen enriched natural gas may also be withdrawn by an absorbent in the extraction device 134. The absorbent may be a metal hydride forming metal such as lanthium nickel or iron-titanium or carbon nanotubes. In this case, the extraction device 134 is a tank filed with the absorbent. By operating valves 136 and compressor 138, pipeline gas is passed through the tank at pipeline pressure, which causes hydrogen to be captured as a metal hydride. The tank is then isolated from the pipeline 34 and vented to the consumer 40. When pressure in the extraction device 134 is reduced, adsorbed hydrogen is also released creating a hydrogen enriched natural gas.

The amount of hydrogen removed by the fuelling station or electricity generating plant may be monitored for billing separately from the natural gas. The hydrogen, or hydrogen enriched natural gas, may carry a different price, a carbon credit or renewable energy benefit. The fuelling station may pass on this benefit to the customer, or offer the customer the option of purchasing a lower emissions or partially renewable fuel.

In an energy system 10 with multiple electrolysers 12, the operation of two or more electrolysers 12 may be controlled together as a fleet. For example, if it is desirable for the grid 14 to have excess electricity consumed, a fleet controller may operate an electrolyser 12 that is subject to fewer electrical transmission restraints, is subject to fewer restraints on the amount of hydrogen that can be injected to a pipeline, or is better able to serve a market for a higher value hydrogen use.

Optionally, hydrogen may be used or injected into a pipeline indirectly. In particular, the hydrogen may be input into a process to create methane. The methane may then be injected into a gas pipeline or supplied to a vehicle fuelling station or electrical generating station. Hydrogen can be converted into methane by, for example, a Sabatier process. In addition to hydrogen, the Sabatier process requires a source of carbon dioxide. The carbon dioxide can be extracted from the exhaust from an engine or furnace, from biogas, or from another carbon sequestration processes. Alternatively, hydrogen can be converted into methane by adding the hydrogen to an anaerobic digester, for example a digester being used to produce methane from biomass. The hydrogen is combined with carbon dioxide in the digester to create methane and increase the methane output of the digester. Alternatively, the hydrogen may be combined outside of the digester with carbon dioxide separates from biogas produced by an anaerobic digester.

Converting the hydrogen to methane consumes about 20% of the potential energy of the hydrogen. However, some of this loss may be recovered as waste heat. Further, methane may be injected in unlimited amounts into a natural gas pipeline. Methane also has about three times the energy density of hydrogen and is the primary fuel of existing natural gas fuelled vehicles. Accordingly, in some cases the conversion to methane may be desirable. In particular, if the cost of producing the hydrogen is at least partially covered by providing grid services, if the consumption of carbon dioxide in the methanation process provides a benefit such as a carbon credit, or if the hydrogen or the electricity used to produce the hydrogen would otherwise have been wasted, then producing methane can be a viable use for the hydrogen.

Claims 21 to 37 of International Application No. PCT/CA2013/050404, filed May 27, 2013, are incorporated by reference.

The invention claimed is:

1. A process comprising the steps of,
   a) providing an electrolyser, wherein the electrolyser comprises a plurality of discrete stack assemblies;
   b) receiving a series of dispatches, each of the dispatches indicating a specified power consumption to be consumed over a specific period of time, the dispatches occurring at least once every 30 minutes;
   c) operating a first subset of the discrete stack assemblies of the electrolyser at a variable rate of power consumption, and operating a second subset of the discrete stack assemblies of the electrolyser each at a continuous rate of power consumption, wherein the continuous rate of power consumption is full power or such that a minimum number of discrete stack assemblies provides the minimum specified power consumption expected over a plurality of dispatches, wherein the electrolyser consumes the specified power consumption over the period of time according to the dispatches; and,
   d) discharging hydrogen produced during step c) to a natural gas system.

2. The process of claim 1 wherein the dispatches occur at least once every 10 minutes.

3. The process of claim 1 wherein the electrolyser consumes the specified power consumption over the period of time according to the dispatches within a specified tolerance.

4. The process of claim 1 wherein step d) comprises converting the hydrogen into methane before injecting it into the natural gas pipeline.

5. The process of claim 1 wherein the electrolyser has a controller and an electricity meter, and wherein the controller is adapted to operate a DC power supply so as to consume electricity at a pre-determined rate.

6. The process of claim 1 wherein in step c) the electrolyser is operated is according to the dispatches as part of an aggregation of i) multiple electrolysers or ii) at least one electrolyser and at least one other variable load.

7. The process of claim 1 wherein the electrolyser has multiple stack assemblies each having a separate power supply and a controller adapted to operate the multiple stack assemblies at different rates of power consumption at the same time.

8. The process of claim 1 further comprising steps of,
   a) receiving data related to a maximum amount of hydrogen that may be injected into a gas pipeline; and,
   b) venting excess hydrogen.

9. The method of claim 8 wherein the data comprises the flow rate of natural gas in the pipeline.

10. The process of claim 1 wherein the electrolyser has multiple stack assemblies that vent upwards to shared gas separators.

11. The process of claim 1 comprising steps of,
    a) withdrawing natural gas from the natural gas system;
    b) measuring the concentration of hydrogen in natural gas withdrawn from the natural gas system; and,
    c) producing a gas mixture with a specified hydrogen concentration by i) adding hydrogen to the natural gas or ii) blending the natural gas with a hydrogen enriched mixture of hydrogen and natural gas withdrawn from a pipeline.

12. An electrolyser comprising,
    multiple stack assemblies;
    shared gas separators above the multiple stack assemblies;
    vents from each of the multiple stack assemblies to the shared gas separators;
    a separate DC power supply for each of the multiple stack assemblies;
    a controller connected to each of the separate DC power supplies; and,
    an electricity meter,
    wherein the controller is adapted to operate the DC power supplies so as to consume electricity at a pre-determined rate.

13. The electrolyser of claim 12 wherein the controller is adapted to operate the multiple stack assemblies at different rates of power consumption at the same time.

14. The process of claim 1 wherein a third subset of the discrete stack assemblies is shut down or put into standby.

15. The process of claim 1 wherein each discrete stack assembly in the second subset of the discrete stack assemblies is operated at full power.

* * * * *